United States Patent [19]

Kettlewell et al.

[11] Patent Number: 5,021,657
[45] Date of Patent: Jun. 4, 1991

[54] THERMAL IMAGER

[75] Inventors: Jonathan P. Kettlewell, Billericay; Brian F. Smith, Rayleigh, both of United Kingdom

[73] Assignee: GEC - Marconi Limited, Stanmore, United Kingdom

[21] Appl. No.: 351,483

[22] Filed: May 15, 1989

[30] Foreign Application Priority Data

May 21, 1988 [GB] United Kingdom ............... 8812089

[51] Int. Cl.$^5$ ................................................ G01J 5/06
[52] U.S. Cl. ....................................... 250/330; 250/352
[58] Field of Search ............... 250/330, 332, 334, 352; 350/1.3, 1.4; 358/113

[56] References Cited

U.S. PATENT DOCUMENTS

| | | | |
|---|---|---|---|
| 4,011,452 | 3/1977 | Meyers | 250/352 |
| 4,380,363 | 4/1983 | Fjeldsted | 350/1.3 |
| 4,453,800 | 6/1984 | Fjeldsted | 350/1.4 |
| 4,593,322 | 6/1986 | Abel | 250/353 |
| 4,933,555 | 1/1990 | Smith | 250/330 |

Primary Examiner—Carolyn E. Fields
Assistant Examiner—Drew A. Dunn
Attorney, Agent, or Firm—Spencer & Frank

[57] ABSTRACT

A thermal imager employs an intermediate field stop (8) which is preferably placed at an intermediate image plane (P) in front of a cryogenically cooled detector (1) mounted on a substrate (2). Radiation gathered by a telescope is directed onto the detector through an aperture (9) in the field stop. The field stop limits the rays which are emitted by the detector and substrate and which are subsequently retro-reflected back to the detector (called narcissus rays).

5 Claims, 2 Drawing Sheets

THERMAL IMAGER

BACKGROUND OF THE INVENTION

This invention relates to a thermal imaging system of the type comprising a telescope for gathering and directing radiation onto a cryogenically cooled detector.

Part of a typical thermal imaging system is shown in FIG. 1, and comprises an encapsulated cooled detector arranged to receive radiation from a lens system and scanner (not shown). The detector and its substrate are generally cryogenically cooled, often by liquid nitrogen, so as to reduce the level of intrinsic noise generated by the detector.

One problem with this arrangement is that the detector and substrate emit radiation characteristic of a low temperature which may be retro-reflected back by the elements of the telescope and the imager body and detected by the detector. The perceived low temperature is not representative of the image the apparatus is intended to view, and is often seen as a dark area in the centre of the image. Such an effect is known as narcissus and tends to degrade the image.

The factors that affect the degree of narcissus in a system are the curvature of the reflecting surfaces, the reflectivity of each surface and the size of the cold area visible to the detector, by reflection.

It is possible to reduce the reflectivity of the surfaces by multi-layer coatings, but no such coating is 100% efficient and a small percentage of radiation will inevitably be reflected. Since the detector and substrate are at a very low temperature, only a small fraction of the difference in radiation of the detector and its surroundings, when added to the temperature of the desired image, is sufficient to create a spurious temperature difference, or narcissus.

BRIEF SUMMARY OF THE INVENTION

According to the present invention there is provided a thermal imager including a detector mounted on a cooled substrate, an optical system and a field stop which is positioned, and is of a suitable size, to limit narcissus rays to those which emanate from the detector only.

Preferably the optical system includes a relay system providing an intermediate image plane and the field stop is located at the intermediate image plane and adapted to limit narcissus rays to those which emanate from the detector only.

The system will generally be a lens system, although a reflective system, such as a mirrored one, could be employed if necessary.

The present invention thus provides a means of limiting the cold area visible to the detector to an area equal to the detector.

Since the substrate is generally significantly larger than the detector itself it is seen that apparatus according to the invention significantly reduces the effect of narcissus by limiting the area from which narcissus rays can emanate. Thus, a simple and effective way of reducing narcissus is achieved.

A specific embodiment of the invention will now be described by way of example with reference to the accompanying drawings in which:

DESCRIPTION OF ONE EMBODIMENT OF THE INVENTION

Figure 1:
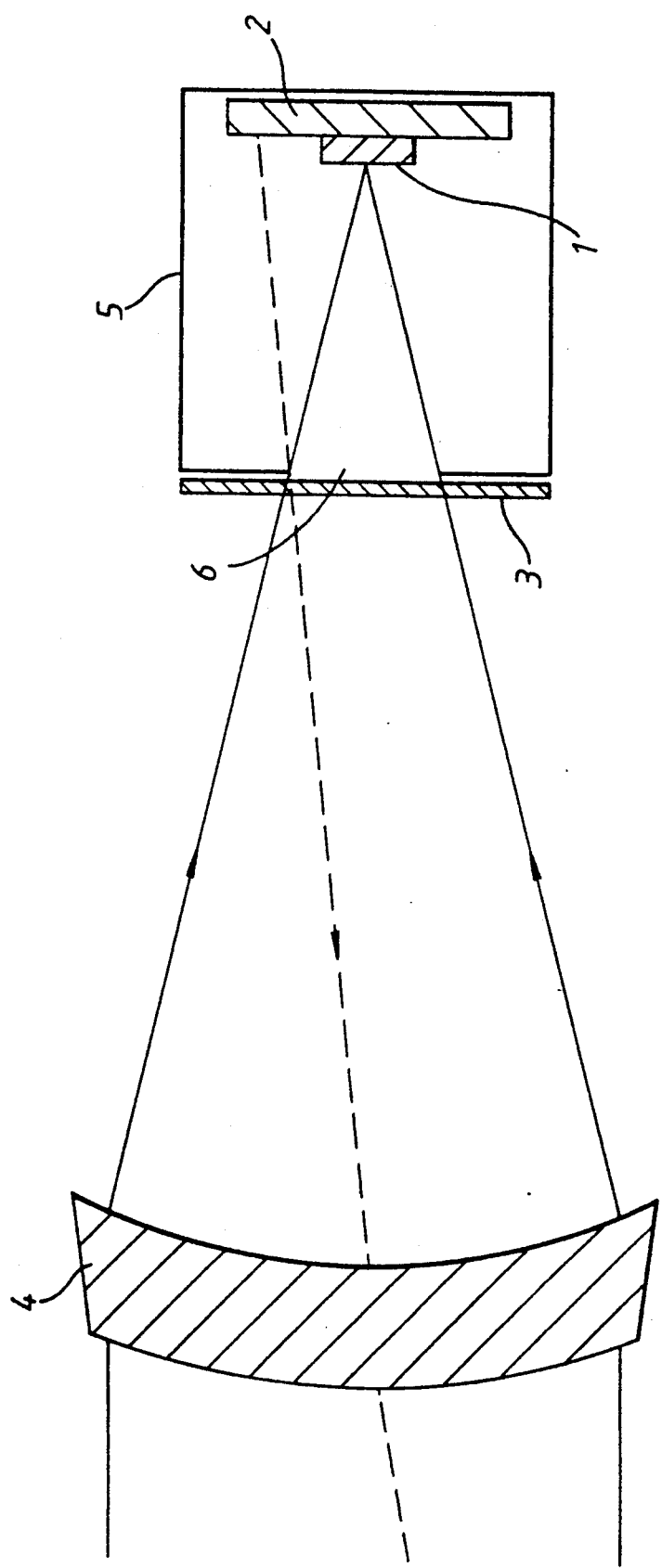
FIG. 1 shows schematically the detector end of a conventional thermal imager; and, FIG. 2 shows schematically a thermal imager employing the invention.

Referring to FIG. 1, which shows part of a conventional thermal imaging system, a cryogenically cooled detector 1 (which may be an array of detectors) is mounted on a substrate 2, encapsulated and then sealed by a window 3 which allows thermal radiation to pass to impinge on the detector 1.

The radiation incident to the detector 1, illustrated in the drawing as representative rays, is gathered by a lens system 4, commonly configured as a focussing objective assembly. A scanning arrangement is usually incorporated within this assembly. The encapsulation of the detector 1 and substrate 2 comprises a radiation shield 5 which shields the detector from some spurious radiation. This radiation shield 5 has an aperture 6 immediately behind the window 3 which admits the converging image beam to reach the detector. The size of this aperture 6 is governed by the numerical aperture of the imaging beam and the separation between the detector substrate 2 and the window 3.

It is seen that rays can emanate from the cool detector 1 and the substrate 2. Such a ray is shown as a broken line in the drawing. These may pass to the telescope of the system or its casing and from there may be reflected back to be detected by the detector 1. In this way the detector 1 may, "see" itself. Such a ray is called a narcissus ray. Because of the very cold temperature of the detector 1 and the substrate 2 even a small amount of such narcissus radiation may seriously degrade the image to be detected.

Figure 2:
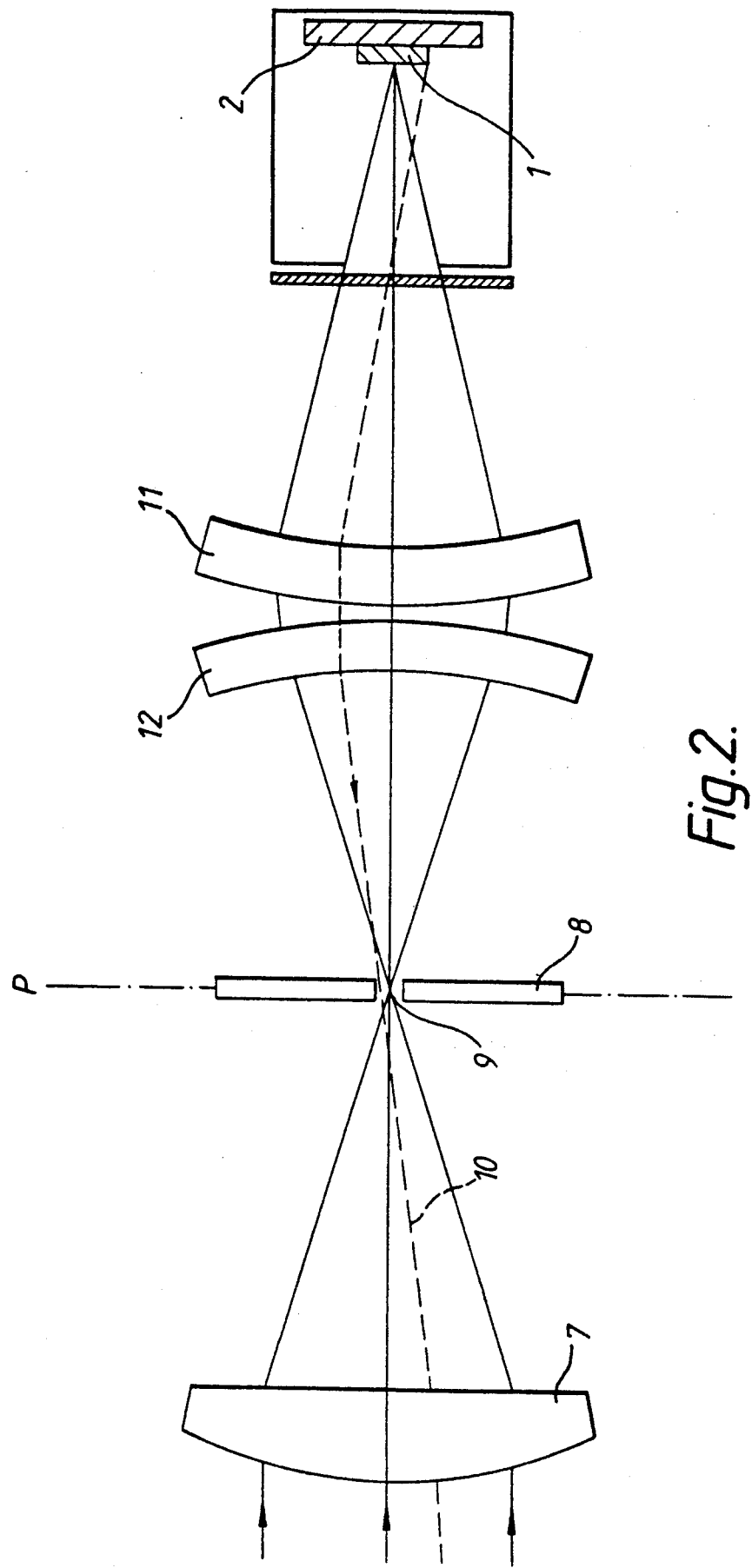

Referring to FIG. 2, in a thermal imager incorporating the invention there is provided a lens 7 forming part of the scanner system. This lens 7 forms a primary image in an intermediate image plane P. An intermediate field stop 8 is accurately positioned at this intermediate image plane. In the intermediate field stop 8 there is provided an aperture 9 the dimensions of which are carefully chosen to limit the narcissus forming rays to those which emanate from the detector only. Such a ray 10 is shown as a broken line in the figure. Lenses 11 and 12 form a relay system which focuses the image on the detector 1.

In this way rays emanating from the cooled substrate 2 are prevented from progressing towards the optics and body of the imager system and possibly reflecting back to be detected by the detector 1. Hence by employing the invention a significant reduction in narcissus may be achieved.

I claim:

1. A thermal imager including a detector mounted on a cooled substrate, an optical system and a field stop which is positioned and is of a suitable size to limit narcissus rays to those which emanate from the detector only.

2. A thermal imager as claimed in claim 1 wherein the optical system provides an intermediate image plane and the field stop is located at the intermediate image plane and adapted to limit narcissus rays to those which emanate from the detector only.

3. A thermal imager as claimed in claim 2 wherein the optical system includes a lens system between the intermediate image plane and the detector.

4. A thermal imager, comprising:
   a detector mounted on a cooled substrate;
   means for forming an intermediate image plane in front of the detector;
   a field stop in the intermediate image plane, the field stop having an aperture; and
   at least one lens between the field stop and the detector and substrate,
   wherein the field stop limits narcissus rays to those which emanate from the detector only, the aperture being dimensioned to block radiation emanating from the substrate.

5. A thermal imager as claimed in claim 4, wherein said aperture has an area that is smaller than the area of the detector.

* * * * *